(12) United States Patent
Grech

(10) Patent No.: US 6,172,805 B1
(45) Date of Patent: *Jan. 9, 2001

(54) POLY-POWERED OPTICAL SYSTEM

(76) Inventor: Leonard Grech, P.O. Box 2774, Capistrano Beach, CA (US) 92624

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/843,730

(22) Filed: Apr. 21, 1997

Related U.S. Application Data

(63) Continuation of application No. 08/374,878, filed on Jan. 19, 1995, now abandoned.

(51) Int. Cl.[7] .................................................. G02B 27/02
(52) U.S. Cl. ........................... 359/407; 359/480; 351/41; 351/47
(58) Field of Search .................................. 359/407, 480, 359/749–753, 680–684, 399, 419–422, 440, 442, 668–671; 351/41, 45, 47

(56) References Cited

U.S. PATENT DOCUMENTS

| | | | |
|---|---|---|---|
| 1,611,647 | * 12/1926 | Kopp | 351/47 |
| 1,685,725 | * 9/1928 | Rowe | 351/47 |
| 3,111,675 | * 11/1963 | Mora | 351/45 |
| 4,023,892 | * 5/1977 | Smith | 351/47 |
| 4,099,849 | * 7/1978 | Lawson et al. | 359/750 |
| 4,155,626 | 5/1979 | Grech | 359/480 |
| 4,555,164 | * 11/1985 | Feinbloom | 351/41 |
| 4,950,055 | * 8/1990 | Tatsuno | 359/753 |
| 4,989,962 | * 2/1991 | Kebo | 359/422 |
| 5,144,480 | * 9/1992 | Ohshita | 359/422 |
| 5,161,065 | * 11/1992 | Ohshita | 359/739 |
| 5,371,626 | * 12/1994 | Betensky | 359/399 |

OTHER PUBLICATIONS

Final Report Peripheral Vision Expander System (PVES), pp. 1–10 and Figs. 1–21, Mar. 28, 1994 prepared by Optics 1, Inc. for Department of Veterans Affairs Rehabilitation R&D Center.

* cited by examiner

Primary Examiner—Kenneth B. Wells
(74) Attorney, Agent, or Firm—Stout, Uxa, Buyan & Mullins, LLP; Donald E. Stout

(57) ABSTRACT

A lens system comprising a plurality of lenses have a peripheral region and a central region. The central region includes a first lens of nonunity power. The central region has a different field of view from the peripheral region.

23 Claims, 3 Drawing Sheets

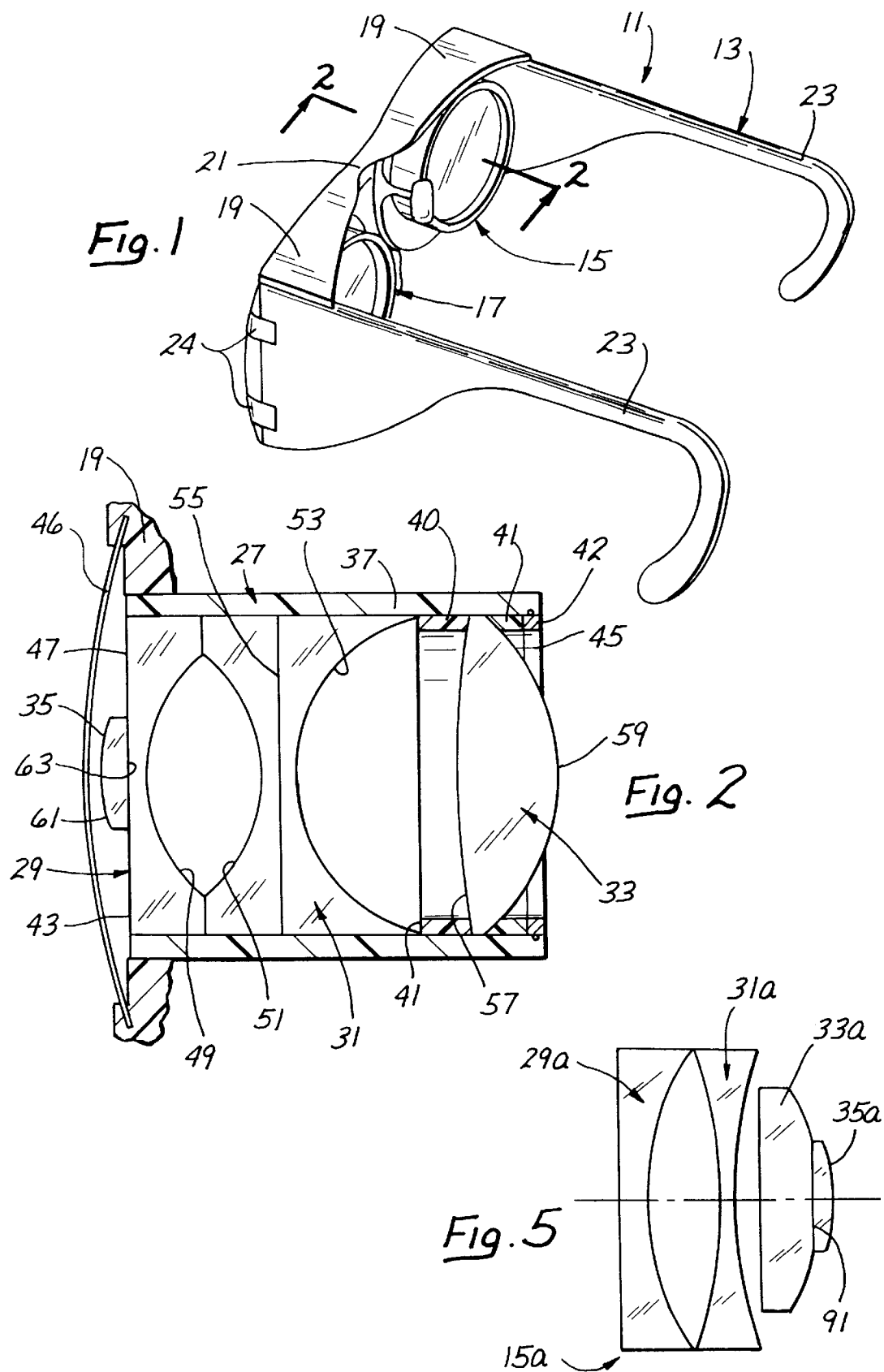

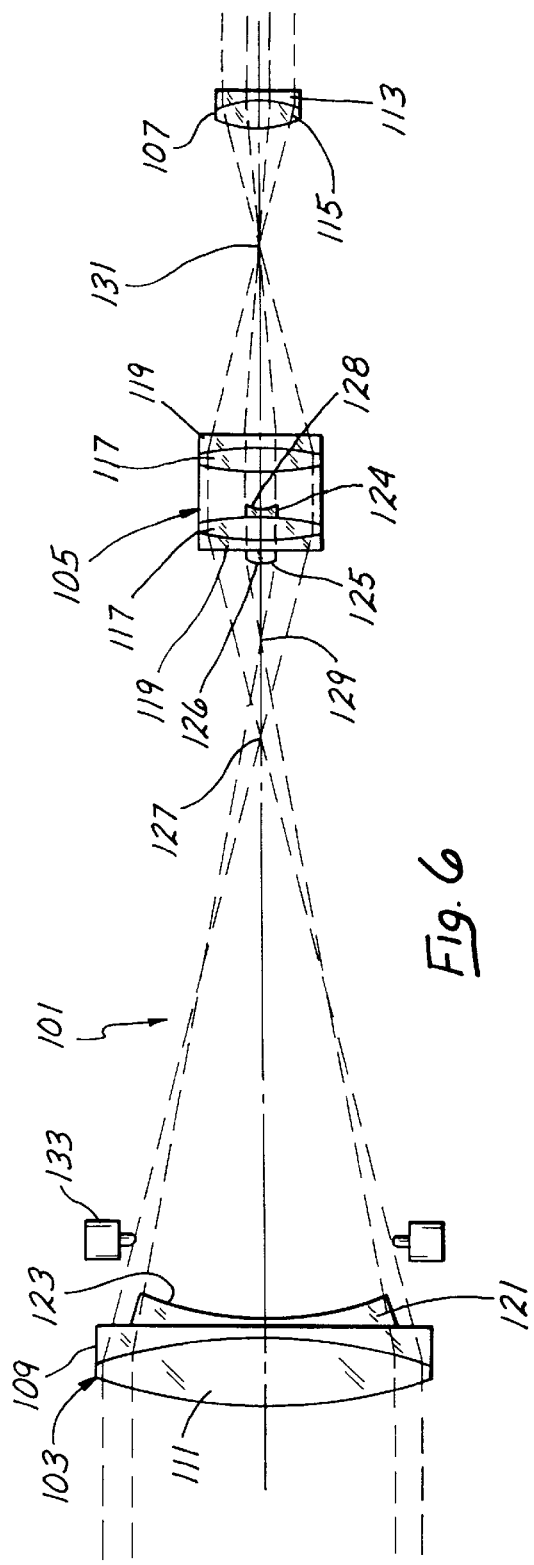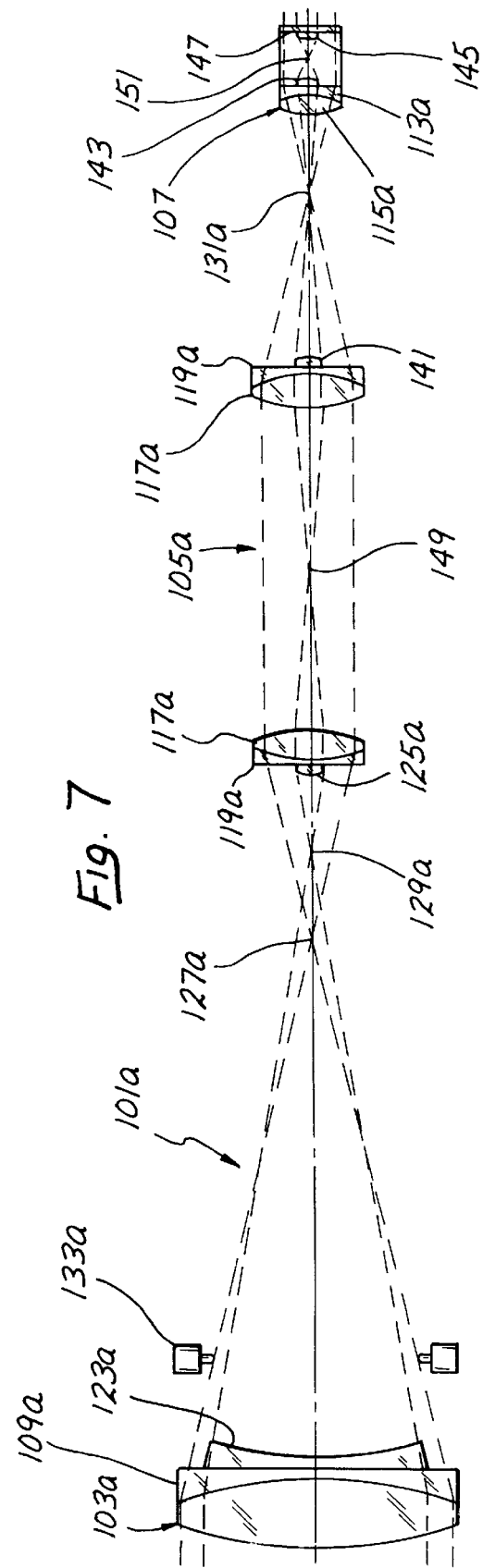

POLY-POWERED OPTICAL SYSTEM

This is a continuation of application Ser. No. 08/374,878, filed Jan. 19, 1995, now abandoned.

BACKGROUND OF THE INVENTION

It is sometimes desirable to have an optical system with multiple fields of view. For example, Grech U.S. Pat. No. 4,155,626 discloses spectacles which provide a wide angle field of view in a peripheral region and an essentially normal field of view without magnification or demagnification in a central region. Spectacles of this type are of particular advantage for individuals with tunnel vision in that the field of view can be enlarged beyond the "tunnel" which defines the normal field of view.

According to the Grech patent, a wide angle lens system is mounted on a spectacle frame and the wide angle lens system includes a central region with flat, parallel surfaces which provide unit magnification. The concept of the Grech patent is sound. However, if the flat surfaces are not aligned quite accurately with the line of sight, the observer may see several circular segments and the information received may be somewhat distorted.

SUMMARY OF THE INVENTION

This invention provides a lens system which has different fields of view in peripheral and central regions and which eliminates the need for the flat surfaces in the central regions of the lenses. With this invention, the central region includes a first lens of nonunity power and this is used in providing a different, and typically narrower field of view in the central region than exists in the peripheral region. Thus, the field of view is narrower in the central field of vision than in the peripheral field of vision.

The lens system of this invention can be put to many different uses including spectacles in which event the lens system is carried by a spectacle frame. For spectacle usage, a peripheral region of the lens system is preferably a wide angle lens system which provides a wider field of view at the peripheral region than would exist without the lens system. The lens system may also be used, for example, in a gunsight telescope, camera and in a security door viewer.

The plurality of lenses of the lens system may include a concave lens having a concave surface in which event the first lens reduces the optical power of the concave lens. The first lens may provide at least a portion of either the proximal or distal surfaces of the plurality of lenses.

Preferably the lens system includes whatever number and kind of lenses that are needed to create the desired field of view in the peripheral field of vision. Typically, these lenses are coaxially arranged. Because the first lens is provided for use in narrowing the field of view in a central field of vision, it preferably has a smaller area in a radial plane than the lenses which are used to create the desired field of view in the peripheral field of vision. In a preferred embodiment, the lens system includes at least two negative lenses and a positive lens and the first lens has a positive optical power.

A conventional gunsight telescope has an objective, an eyepiece and at least one erector lens. The lens system of this invention can be utilized in a gunsight telescope to provide a narrower field of view through the gunsight telescope in a central field of view than in a peripheral field of view. In one preferred construction, the lens system provides a greater than unity magnification in both the central and peripheral regions.

A preferred way to achieve multiple fields of view in a gunsight telescope is to have a central region of the objective lens have a longer focal length than a peripheral region of the objective lens and a central region of the erector lens have a shorter focal length than the peripheral region of the erector lens. This can be accomplished, for example, by employing a central negative objective lens surface and a positive central erector lens surface with the objective surface being a posterior surface of the objective lens and the erector surface being an anterior surface of the erector lens. If desired, a shutter can be provided for selectively blocking the peripheral field of vision while permitting light to be transmitted in the central field of vision. This can be used, for example, to block the wider angle peripheral field of vision when using the gunsight for sighting through the central region.

The invention, together with additional features and advantages thereof may best be understood by reference to the following description taken in connection with the accompanying illustrative drawings.

BRIEF DESCRIPTION OF THE DRAWINGS

FIG. 1 is a perspective view of spectacles carrying a lens system constructed in accordance with the teachings of this invention.

FIG. 2 is an enlarged sectional view taken generally along line 2—2 of FIG. 1.

FIG. 5 is a view similar to FIG. 2 showing another embodiment of lens system with the housing removed.

FIG. 6 is a schematic side elevational view of a gunsight telescope embodying the lens system of this invention.

FIG. 7 is a view similar to FIG. 5 showing a second embodiment of gunsight telescope constructed in accordance with the teachings of this invention.

DESCRIPTION OF THE PREFERRED EMBODIMENT

Figure 3:
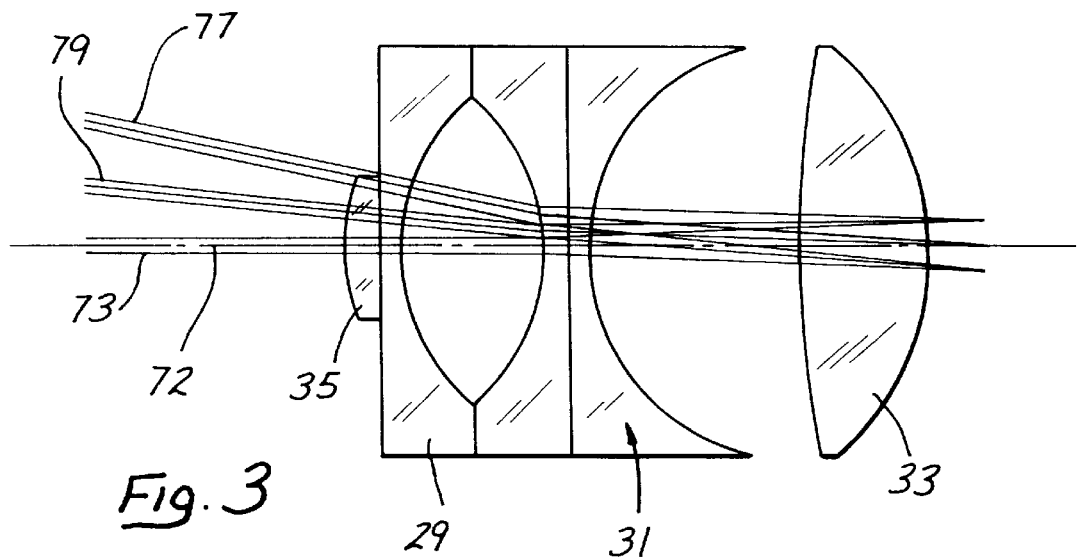
FIG. 3 is a schematic side elevational view of the lens system showing a ray tracing through the central field of view.

FIG. 1 shows spectacles 11 which generally comprise a spectacle frame 13 and lens systems 15 and 17. The frame 13 may be constructed of a metal or a polymeric material in a conventional manner. In the embodiment illustrated, the frame 13 is constructed of a suitable polymeric material and includes identical lens holders integrally joined by a central nose piece 21. The frame 13 also includes temple bars 23 pivotally joined to the lens holders 19, respectively, by hinges 24.

Each of the lens systems 15 and 17 provides a peripheral field of vision and a central field of vision with the field of view being narrower in the central field of vision than in the peripheral field of vision. Preferably the lens systems 15 and 17 provide a wider field of view in the peripheral field of vision than would exist without the lens system. The lens systems 15 and 17 may be identical, or each of them may be of a different construction, so long as they accomplish the basic purpose of the invention. In addition, each of the lens systems 15 and 17 may provide vision correction powers to adapt them to the characteristics of the eyes of the wearer so they can provide the correction, if any, required by the eyes of the wearer. It is assumed for purposes of this description that the lens systems 15 and 17 are identical, and for this reason only the lens system 15 is described in detail herein.

Although the lens system 15 may be of different constructions, in the embodiment illustrated it includes a housing 27 and four lenses 29, 31, 33, and 35 arranged coaxially in series so that light passes through the lenses in passing to the eye of the user. The housing 27 includes a peripheral wall 37 of cylindrical configuration, annular spacers 40 and 41 and an annular retainer 42. The peripheral wall 37 has a large diameter circular opening 43. The lens 29 is preferably adhered to the peripheral wall 37 by a suitable adhesive, and the retainer 42 holds the spacers 40 and 41 and the lenses 31, 33 and 35 in the position of FIG. 2. The retainer 42 has a circular opening 45 coaxial with the opening 43.

Although other materials could be used, in this embodiment the housing 27 is constructed of a polymeric material. The housing 27 can be suitably mounted on the lens holder 19 in any suitable manner. As shown in FIG. 2, one end of the peripheral wall 37 is received within the lens holder 19. The peripheral wall 37 of each lens system 15 and 17 may be retained in place in the associated lens holder 19 by an adhesive or other suitable means where the lens systems are largely concealed by the lens holders 19 and the width of the temple bars, the latter also serving to reduce glare. A smoked lens 46 of unity power may be attached to the lens holder 19 to conceal the housing 27 and its contents.

The lenses 29, 31 and 33 form a wide angle lens system. The lens 29 is a plano concave lens having a planar anterior face 47 and a concave posterior face 49. The lens 31 is a biconcave lens having an anterior concave surface 51 and a posterior concave surface 53. In this embodiment, the biconcave lens 31 includes two piano concave lenses having their planar surfaces 55 in abutting relationship; however this is purely illustrative in that the biconcave lens 31 can be a single lens element, if desired. The lens 33 is a biconvex lens having an anterior convex surface 57 and a more convex posterior convex surface 59.

The plano convex lens 29, the biconcave lens 31 and the biconvex lens 33 form a wide angle lens system. Wide angle lens systems of this type and comprising lenses of this kind are known and are similar to the type used in security doors. Also, except for the absence of flattened portions on the concave and convex surfaces, the wide angle lens system provided by the lenses 29, 31 and 33 are disclosed in Grech U.S. Pat. No. 4,155,626.

To create a narrower field of view in a central field of vision, the lens 35 is employed. Although the lens 35 in the embodiment shown in FIG. 2 is a separate lens adhered by an optically clear adhesive to the planar surface 47 of the lens 29, it may, if desired, be an integral portion of the lens 29, i.e. a central surface of the lens 29 appropriately shaped to provide the desired power. In either event, the lens 35 is of nonunity power and reduces the optical power of the plano concave lens 29. More specifically, the lens 35 is a positive lens which reduces the negative power of the negative plano concave lens 29 to thereby create a narrower field of view in the central field of vision. The lens 35 has an anterior convex surface 61 and a planar posterior surface 63. Because the lens 35 is of smaller radial dimensions than the lenses 29, 31 and 33 and has a smaller area in a radial plane than any of the lenses 29, 31 and 33, it creates the narrower field of view only in the central field of vision.

The various characteristics of the lenses 29, 31 and 33, such as focal length, thickness, radii of the curved surfaces, axial spacing between lenses, etc. can be readily selected by those skilled in the art. By way of example, the lenses 29, 31, 33 and 35 can be constructed in accordance with the following table where all dimensions are in millimeters and the focal length for the biconcave lens 31 applies to both concave surfaces:

| Lens | Diameter | Focal Length |
| --- | --- | --- |
| 29 | 40 | −40 |
| 31 | 40 | −40 |
| 33 | 40 | 44 |
| 35 | 15 | 50 |

Figure 4:
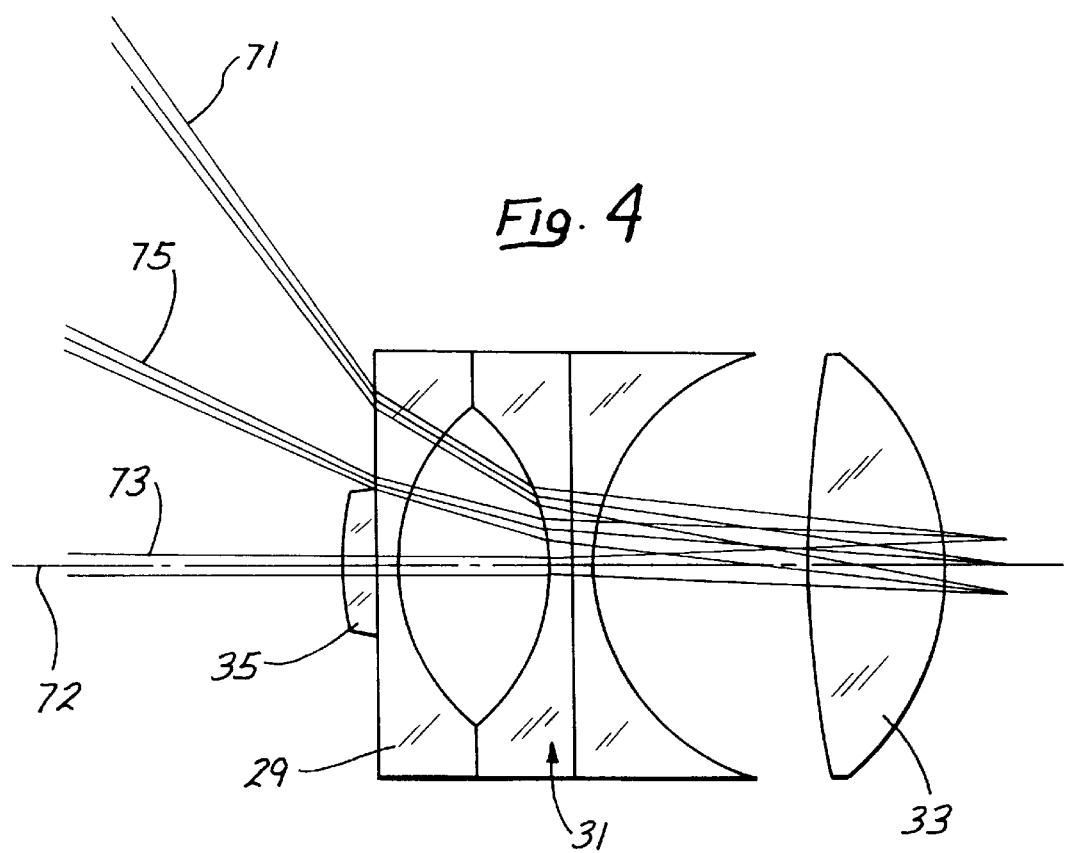
FIG. 4 is a view similar to FIG. 3 showing a ray tracing through the wide field of view.

FIGS. 3 and 4 show ray tracings for the central and peripheral fields of vision, respectively. Generally the central field of view is defined by the rays passing through the lens 35 and the peripheral field of view is defined by the rays passing through the lens 29 outside of the lens 35. If, for example, the lenses identified in the table above are utilized in FIGS. 3 and 4, then the narrow central field of vision provides a magnification of 0.4× and the wide peripheral field of vision has a magnification of 0.2×. It can also be shown that the central field of vision maps an angular range at the eye from about 0 degrees to ±5 degrees into object space angles of 0 degrees to approximately ±11.6 degrees. The wide field of view of the peripheral region maps the remaining angles at the eye from approximately ±5 degrees to ±11 degrees into object space angles from approximately ±12.5 degrees up to ±55 degrees. Of course, selecting different lenses with different physical parameters would yield different results and those given above are merely illustrative.

Both the central region and the wide peripheral region create narrow bundles of beams, which are shown by way of example in FIGS. 3 and 4, and which are close to but not truly collimated. By having narrow bundles of beams at the lens 35, a small transition region is created which the viewer sees between the central and peripheral regions. Accordingly, the effect of transitioning between the narrow and wide fields of view is minimized. As shown in FIG. 4, the central ray of a peripheral bundle of beams 71 and an optical axis 72 of the lens system 15 form a 55 degree angle. A central ray of a central bundle of beams 73 extends along the optical axis 72. The lens 29 is a negative lens and refracts the peripheral bundle of beams 71 and an intermediate bundle of beams 75 so that they extend toward the optical axis 72 at a smaller angle. However, the central bundles of beams 77 and 79 (FIG. 3) which pass through the lens 35 are not refracted like the bundles of beams 71 and 75 so as to extend toward the optical axis at a significantly smaller angle. This is the result of the reduction in negative power provided by the positive lens 35. Consequently, the field of view through the central region is narrower than the field of view through the peripheral region. As shown in both FIGS. 3 and 4, all of the bundles of beams are directed to a confined region for visualization by the eye of the wearer of the spectacles 11.

Magnification as used herein refers to angular magnification. Angular magnification is a ratio between the angle created by a beam entering the lens system 15 to the angle of the beam when it reaches the pupil of the eye of the wearer of the spectacles. Thus, for the lenses identified in the table above, the total field of view in object space for the lens system 15 is about 23.3 degrees and the total apparent field of view at the pupil of the eye is 10 degrees yielding a magnification of 0.4× whereas in the peripheral region, the total field of view in object space is 110 degrees, the total apparent field of view at the pupil of the eye of the wearer of the spectacles is 22 degrees providing a magnification of 0.2x. These numbers are purely illustrative and can be varied by selecting different values for the lenses 29, 31, 33 and 35.

In use, the spectacles 11 can be worn like an ordinary pair of glasses. The lens systems 15 and 17 increase the field of vision of the user over the field of vision which the user would have without the wide angle lens system. The central regions of the lens systems 15 and 17 provide a narrower field of view than in the peripheral region and does so while minimizing the effect of the transition region between the narrow and wide fields of view.

FIG. 5 shows a lens system 15a which may be identical to the lens system 15 in all respects not shown or described herein. Portions of the lens system 15a corresponding to portions of the lens system 15 are designated by corresponding reference numerals followed by the letter a.

One difference between the lens system 15a and the lens system 15 is that the lens 35a is on the posterior or proximal surface of the lens system rather than on the anterior or distal surface of the lens system. In addition, the lens 33a is a plano convex lens having a flat central region 91 on which the lens 35a is adhered by an optically clear adhesive. Also, in the lens system 15a the biconcave lens 31a is shown as a single lens element rather than two plano concave lens elements.

In the lens system 15a, like in the lens system 15, the lens 35a is a positive lens which reduces the negative power of the lens system in the central region to thereby provide a narrower field of view in the central region than in the peripheral region. The lens system 35a is a positive lens and may be incorporated into the lens 33a simply by providing the desired surface on the central region of the lens 33a.

By way of example, the lenses of the lens system 15a may have the following characteristics expressed in millimeters and the focal length for the biconcave lens 31a applies to both concave surfaces:

| Lens | Diameter | Focal Length |
|------|----------|--------------|
| 29a | 30 | −50 |
| 31a | 30 | −50 |
| 33a | 20 | 32.7 |
| 35a | 10 | 37 |

The lens system 15a may be used in the spectacles 11. Alternatively, the lens system 15a, like the lens system 15, may be used in a variety of other optical systems.

FIG. 6 shows a gunsight telescope 101 embodying the features of this invention. As is common in gunsight telescopes, the gunsight telescope 101 includes an objective or objective lens 103, an erector or erecting lens system 105 and an eyepiece 107. In a conventional gunsight telescope, the objective 103 forms an inverted real image in the focal plane of the erecting lens system and the erecting lens system provides an erect real image in the focal plane of the eyepiece. A reticle may also be placed in the focal plane of the eyepiece.

As is not uncommon, the objective 103 includes a plano concave lens 109 and a biconvex lens 111, and the eyepiece similarly includes a plano concave lens 113 and a biconvex lens 115. As is also quite common, the erecting lens system 105 includes anterior and posterior doublets, each of which comprises a biconvex lens 117 and a plano concave lens 119 and each of which functions as a positive lens.

The gunsight telescope 101 differs from the prior art known to applicant in that it includes a lens system which provides a narrower field of view through the gunsight telescope in a central field of vision than in a peripheral field of vision. In the embodiment of FIG. 6, this is accomplished by employing an objective which includes a central region with a longer focal length than a peripheral region of the objective and an erecting lens system having a central region with a shorter focal length than a peripheral region of the erecting lens system. Thus, the objective 103 includes a negative lens 121 in the form of piano concave lens having a concave surface 123 defining the posterior surface of the objective in a central region of the objective. The lens 121 has smaller radial dimensions than the lenses 109 and 111 thereby leaving a peripheral region of the objective, i.e. the region of the objective 103 radially outwardly of the lens 121 is unaffected by the plano concave lens 121.

In addition, the gunsight 101 departs from the prior art known to the inventor in including a relatively small positive lens 125 and a relatively small negative lens 124. In this embodiment, the lenses 125 and 124 are in the form of a piano convex lens and a double concave lens, respectively. The positive lens 125 has a convex erecting surface forming the anterior or distal surface of the erecting lens system 105 in a central region. The negative lens 124 is on the posterior surface of the anterior lens 117. The positive lens 125 and the negative lens 124 are of smaller radial dimensions than the lenses 117 and 119 thereby leaving a peripheral region of the erecting lens system, i.e. the region of the erecting lens system radially outwardly of the lenses 124 and 125 unaffected by the lenses 124 and 125.

The negative lens 124 has a posterior concave surface 128. The lenses 124 and 125 are coaxial, preferably have the same radial dimensions and are adhered to associated lenses 117 and 119, respectively.

The peripheral region of the objective 103 has a focal point 127 which is substantially in the focal plane of the erecting lens system 105, i.e. in the focal plane of the anterior doublet lenses 117 and 119. Consequently, the image received by the user is a somewhat magnified view of the peripheral region. However, in the central region the negative lens 121 provides the central region with a focal point 129. As shown in FIG. 6, the focal length of the central region of the objective 103 is longer than the focal length of the peripheral region of the objective 103. The focal point 129 is substantially in the focal plane of the positive lens 125. Consequently, erect real images from the central and peripheral fields of vision are provided at the focal point 131 of the erecting lens system 105, i.e. in the focal plane of the posterior doublet lenses 117 and 119, and magnified images in both the central and peripheral fields can be seen by the user. However, because of the longer focal length of the central region of the objective 103, the central region has higher magnification and a narrower field of view than the peripheral region. The purpose of the negative lens 124 is to compensate sufficiently for the positive lens 126 so that the rays in the central field of vision leaving the lens 124 are collimated. With this arrangement, the user may locate a target through the wider peripheral field of view and then use the higher magnification narrower field of view of the central region for aiming at the target. The gunsight telescope 101 may include a conventional reticle located at the focal plane 131.

Of course, the fields of view and magnification in the central and peripheral fields can be varied by employing different focal lengths for the central and peripheral regions of the objective 103. In one example, the magnification in the peripheral and central fields are about 4 and 10.6, respectively and the lenses of the gunsight telescope 101 are as follows:

| Lens(es) | Diameter | Focal Length |
| --- | --- | --- |
| 107 | 18 | 30 |
| 117, 119 (posterior doublet) | 25 | 40 |
| 124 | 7 | −35 |
| 117, 119 (anterior doublet) | 25 | 40 |
| 125 | 6.5 | 17 |
| 121 | 51 | −1080 |
| 109, 111 | 66.5 | 120 |

Another feature of the invention is a shutter 133 for selectively blocking the peripheral field of vision while permitting light to be transmitted in the central field of vision. Thus, after locating a target using the peripheral field of vision, the peripheral field can be selectively blocked off so that the user can better sight through only the central field of vision.

FIG. 7 shows a gunsight telescope 101*a* which is identical to the gunsight telescope 101 in all respects not shown or described herein. Portions of the gunsight telescope 101*a* corresponding to portions of the gunsight telescope 101 are designated by corresponding reference numerals followed by the letter a.

The gunsight telescope 101*a* functions in substantially the same manner as the gunsight telescope 101 as to the peripheral field of vision. The primary difference between the gunsight telescopes 101*a* and 101 is that the image in the central field of view is inverted two additional times in the gunsight telescope 101*a*. This is brought about by the elimination of the negative lens 124 and the addition of small positive lenses 141, 143 and 145 on the posterior faces of the posterior lens 119*a*, the posterior face of the lens 113*a* and an anterior face of a glass mounting plate 147. Without the negative lens 124, the lenses 117*a*, 119*a* and 125*a* at the distal end of the erecting lens system 105*a* in the central region have a focal point 149 in the focal plane of the central region of the lenses 117*a*, 119*a* and 141 at the proximal or posterior end of the erecting lens system 105*a*. The rays from the peripheral and central fields of vision are focused at the focal point 131*a* and the lenses 143, 113*a* and 115*a* have a focal point 151 in the focal plane of the positive lens 145. Consequently, the image from the central field is inverted at the focal points 129*a,* 149, 131*a* and 151 so as to provide an erect image from the central field for the user. A reticle may be placed at the focal point 131*a*.

The gunsight telescope 101*a* can also provide various different magnifications as desired. In one example the magnifications in the peripheral and central fields are about 6 and 14.7, respectively and the lenses of the gunsight telescope 101*a* are identical to the lenses of the telescope 101 except as set forth below where all dimensions are expressed in millimeters:

| Lens(es) | Diameter | Focal Length |
| --- | --- | --- |
| 145 | 4 | 10 |
| 113a, 115a, 151 | 13 | 20 |
| 141 | 6 | 37 |
| 125a | 6 | 17 |

Although exemplary embodiments of the invention have been shown and described, many changes, modifications and substitutions may be made by one having ordinary skill in the art without necessarily departing from the spirit and scope of this invention. For example, the lens system of this invention may be used in various other devices such as door viewers, cameras, security cameras and the like.

I claim:

1. A lens system comprising a plurality of lenses and having a peripheral region and a central region, said central region including at least a first lens of nonunity power for use in providing said central region with a different field of view than the peripheral region.

2. A lens system as defined in claim 1 wherein the first lens provides the central region with a narrower field of view than the peripheral region.

3. A lens system as defined in claim 2 wherein the plurality of lenses includes a concave lens having a concave surface and said first lens reduces the optical power of the concave lens.

4. A lens system as defined in claim 2 wherein the plurality of lenses provide a wider field of view at the peripheral region than would exist without the plurality of lenses.

5. A lens system as defined in claim 2 including a shutter for selectively preventing the peripheral region from transmitting light to a desired location while permitting light to be transmitted by the central region.

6. A lens system as defined in claim 2 wherein said lens system has proximal and distal surfaces and said first lens provides at least a portion of said proximal surface.

7. A lens system as defined in claim 2 wherein said lens system has proximal and distal surfaces and said first lens provides at least a portion of said distal surface.

8. A lens system as defined in claim 2 wherein said plurality of lenses includes second and third lenses, said first, second and third lenses are coaxial and said first lens has a smaller area in a radial plane than either of the second and third lenses.

9. A lens system as defined in claim 2 wherein said plurality of lenses includes at least two negative lenses and a positive lens and said first lens has a positive optical power.

10. A lens system as defined in claim 9 wherein the first lens is proximal of said negative and positive lenses.

11. A lens system as defined in claim 9 wherein the first lens is distal of said negative and positive lenses.

12. A lens system as defined in claim 2 wherein both the peripheral and central region provide greater than unity magnification.

13. A lens system as defined in claim 2 wherein the first lens is a positive lens.

14. A lens system as defined in claim 1, wherein said plurality of lenses includes at least one negative lens and a positive lens and said first lens has a positive optical power.

15. A lens system as defined in claim 2, including a spectacle frame, wherein said lens system is carried by said spectacle frame.

16. Wide angle spectacles comprising:
a spectacle frame;
a lens system attached to the spectacle frame;

said lens system including at least first and second lenses arranged so that light passes through said first lens and said second lens in traveling to the eye of the user;

a peripheral region of said lens system being a wide angle lens system for increasing peripheral vision of the user over the field of vision which the user would have without the wide angle lens system;

said lens system including a central region through which at least some light can pass to the eye of the user; and said central region having a lens portion of nonunity power thereby creating a narrower field of view than the peripheral region.

17. In a gunsight telescope having an objective, an eyepiece and at least one erecting lens, the improvement comprising:

a lens system which provides a narrower field of view through the gunsight telescope in a central field of vision than in a peripheral field of vision.

18. An improvement as defined in claim 17 wherein the lens system provides greater than unity magnification in both the central and peripheral fields of vision.

19. An improvement as defined in claim 17 wherein the lens system includes a central region of the objective having a longer focal length than a peripheral region of the objective and a central region of the erecting lens having a shorter focal length than a peripheral region of the erecting lens.

20. An improvement as defined in claim 17 wherein the lens system includes a central negative objective surface and a positive central erecting lens surface, said objective surface being a posterior surface of the objective and the erecting surface being an anterior surface of the erecting lens.

21. An improvement as defined in claim 17 including a shutter for selectively blocking the peripheral field of vision while permitting light to be transmitted in the central field of vision.

22. An improvement as defined in claim 17 wherein images are provided from both the central field of vision and the peripheral field of vision and the image from the central field of vision is inverted more times between the objective and the eyepiece than the image from the peripheral field of vision.

23. A lens system comprising a plurality of lenses and having a peripheral region and a central region, said lens system including:

first and second lenses arranged coaxially so that light passes through said first lens and said second lens in traveling to an eye of a user;

a peripheral region which is a wide angle system for increasing peripheral vision of the user over the field of vision which the user would have without the wide angle lens system;

a central region through which at least some light can pass to the eye of the user, said central region having a lens portion of nonunity power to thereby create a narrower field of view than exists in said peripheral region;

a third lens arranged coaxially with said first and second lenses, said first lens having a smaller area in a radial plane than either of the second or third lenses;

said first lens having a positive optical power;

wherein both the peripheral and central regions provide greater than unity magnification.

\* \* \* \* \*